(12) United States Patent
Kocksch

(10) Patent No.: US 9,731,224 B2
(45) Date of Patent: Aug. 15, 2017

(54) FILTER ELEMENT AND FILTER DEVICE

(71) Applicant: MANN+HUMMEL GMBH, Ludwigsburg (DE)

(72) Inventor: Christian Kocksch, Roemerberg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 183 days.

(21) Appl. No.: 14/634,135

(22) Filed: Feb. 27, 2015

(65) Prior Publication Data
US 2015/0165344 A1    Jun. 18, 2015

Related U.S. Application Data

(63) Continuation of application No. PCT/EP2013/066181, filed on Aug. 1, 2013.

(30) Foreign Application Priority Data

Aug. 30, 2012    (DE) .......... 10 2012 017 140

(51) Int. Cl.
| | |
|---|---|
| *B01D 19/00* | (2006.01) |
| *B01D 29/52* | (2006.01) |
| *B01D 36/00* | (2006.01) |
| *B01D 29/21* | (2006.01) |
| *B01D 29/54* | (2006.01) |
| *B01D 29/90* | (2006.01) |

(52) U.S. Cl.
CPC ......... *B01D 19/0031* (2013.01); *B01D 29/21* (2013.01); *B01D 29/52* (2013.01); *B01D 29/54* (2013.01); *B01D 29/902* (2013.01); *B01D 36/001* (2013.01); *B01D 2201/403* (2013.01)

(58) Field of Classification Search
CPC .... B01D 19/0031; B01D 29/21; B01D 29/52; B01D 29/54; B01D 29/902; B01D 36/001; B01D 2201/403; B01D 46/002; B01D 46/0021
See application file for complete search history.

(56) References Cited

U.S. PATENT DOCUMENTS

| | | |
|---|---|---|
| 4,531,954 A | 7/1985 | Klein |
| 6,623,631 B1 | 9/2003 | Graus et al. |
| 7,153,425 B2 | 12/2006 | Stankowski et al. |
| 7,166,147 B2 | 1/2007 | Vesper et al. |
| 2012/0132582 A1 | 5/2012 | Glueck |

FOREIGN PATENT DOCUMENTS

DE           19939970 A1    3/2001

*Primary Examiner* — Robert Clemente
(74) *Attorney, Agent, or Firm* — James Hasselbeck

(57) ABSTRACT

A filter element for filtering a fluid has a first filter medium arranged in annular shape and surrounding an interior. A second filter medium is provided, wherein the first filter medium and the second filter medium separate a clean side of the filter element from a raw side of the filter element. The first filter medium and the second filter medium are arranged such that a fluid to be filtered flows from the raw side of the filter element to the clean side of the filter element in parallel through the first filter medium and the second filter medium. The first filter medium is liquid-permeable and gas-impermeable and the second filter medium is liquid-impermeable and gas-permeable.

18 Claims, 3 Drawing Sheets

FILTER ELEMENT AND FILTER DEVICE

CROSS-REFERENCE TO RELATED APPLICATIONS

This application is a continuation application of international application No. PCT/EP2013/066181 having an international filing date of 1 Aug. 2013 and designating the United States, the International Application claiming a priority date of 30 Aug. 2012, based on prior filed German patent application No. 10 2012 017 140.4, the entire contents of the aforesaid international application and the aforesaid German patent application being incorporated herein by reference.

BACKGROUND OF THE INVENTION

The present invention concerns a filter element for filtering a fluid, in particular a urea solution, as well as a filter device, in particular a urea filter device.

For example, urea solutions are employed in exhaust gas treatment in motor vehicles for reducing nitrogen oxide emissions. In this context, urea solution is injected by nozzles in the exhaust gas manifold. In particular for preventing clogging of the nozzles, the urea solution must be filtered. Often, a filter suitable for filtration of a urea solution is also referred to as urea filter.

For filtering the urea solution it is known to employ a filter element which, at the suction side, is supplied or loaded with vacuum or underpressure. Vacuum causes degassing of the urea solution so that gases will accumulate at the highest region of the filter element or of a filter device receiving the filter element. It is important to guide the accumulated gases in the form of small bubbles out of the filter element or the filter device in order not to impair the function of downstream components, in particular, of the aforementioned nozzles.

A further aspect which is to be taken into consideration when developing filter elements for urea solution is that the urea solutions freeze at approximately −11° C. In this context, it is known for example from WO 2010/139706 A1 to provide a compensation body of elastically deformable material. The compensation body absorbs a volume increase upon freezing of the urea solution.

SUMMARY OF THE INVENTION

An object of the present invention resides in providing an improved filter element as well as an improved filter device. In particular, an object of the present invention resides in at least reducing the accumulation of large gas bubbles in the filter element or in the filter device.

As a solution to this object a filter element for filtering a fluid, in particular a urea solution, is proposed. The filter element comprises a liquid-permeable and gas-impermeable first filter medium and a liquid-impermeable and gas-permeable second filter medium. The first and second filter media are arranged between a raw side and a clean side of the filter element, respectively.

In one embodiment, the filter element surrounds in an annular shape an interior and can be flowed through from a raw side to a clean side in parallel through at least the first and the second filter medium that are arranged between the raw side and a clean side of the filter element, respectively, wherein the first filter medium is liquid-permeable and gas-impermeable and the second filter medium is liquid-impermeable and gas-permeable.

While the first filter medium has the task of purifying the fluid, in particular the urea solution, i.e., filtering out in particular undesirable particles from it, the second filter medium is designed to effect a continuous transport of small gas bubbles from the raw side to the clean side of the filter element. In this way, the accumulation of large gas quantities in the filter element or in a filter device receiving the filter element is prevented.

The first filter medium is, for example, basically gas-permeable but in a state fully soaked with the fluid is blocked by the surface tension of the fluid, in particular of the urea solution. The second filter medium is, for example, liquid-permeable in principle but this applies only above a predetermined differential pressure that is greater than an operating differential pressure acting on the second filter medium in operation of the filter element.

Preferably, the second filter medium is (geodetically) arranged higher than the first filter medium.

The fluid is typically a liquid, in particular a urea solution.

The first filter medium can be embodied, for example, as a nonwoven, laid web, or woven fabric. Moreover, the first filter medium can be folded, for example, in the form of a bellows. Moreover, the first filter medium may comprise paper.

The second filter medium can be embodied, for example, of polytetrafluoroethylene (PTFE).

According to an embodiment, the first filter medium is hydrophilic or oleophilic and the second filter medium is hydrophobic or oleophobic. In this way, it is achieved that the first filter medium will be soaked with water (this is meant to include in general also solutions in water) or oil (this is meant to include in general also solutions in oil) and a blocking action in regard to passage of gases through the first filter medium is generated in this way. In contrast, water or oil (this applies correspondingly also generally to solutions in water or oil) cannot penetrate into the second filter medium so that the latter is permeable for passage of gases.

According to a further embodiment, the first filter medium is gas-impermeable and liquid-permeable above a first differential pressure and the second filter medium is gas-permeable and liquid-impermeable below a second differential pressure, wherein the second differential pressure is greater than the first differential pressure and an operating differential pressure at which the filter element can be operated is between the first and the second differential pressures. In this way, it is achieved that the liquid, in particular the urea solution, passes only through the first filter medium and is filtered by it. The second filter medium, on the other hand, remains impermeable for the liquid. The first filter medium has then the aforementioned blocking action relative to gases while the second filter medium allows passage of the gases, in particular in the form of small bubbles. The operating differential pressure is preferably in a range between 0 bar and 0.7 bar.

In one embodiment, it is provided that the first filter medium is of a closed annular configuration and surrounds, folded in a star shape or wound, the interior of the filter element.

In a further embodiment, at one or both end faces of the annularly closed first filter medium an end disk is arranged which serves for sealing the end face surface of the first filter medium. A connector for discharging the filtered fluid or supplying fluid to be filtered is provided preferably in one end disk.

In a preferred embodiment, the second filter medium is arranged in an opening in one end disk. Since the end disk closes off the annular filter medium in axial direction, the second filter medium is thereby also arranged at an axial end or the end face of the filter body that is formed by the annular first filter medium. The filter element can thus be used vertically in a filter wherein the end with the second filter medium is pointing upwardly. Gas that rises within the filter to the top can thus be discharged above the first filter medium through the second filter medium.

According to a further embodiment, the second filter medium is embodied in an opening of the collar of the filter element which is projecting away from the end disk and provides a connector of the filter element for discharging filtered fluid or for supplying filtered fluid. Accordingly, since the second filter medium or the opening which is closed off by the filter medium is arranged in the collar of the filter element, the second filter medium (geodetically) is arranged at the top. In particular, the opening or the second filter medium is thus arranged above the first filter medium. Gas which migrates inherently to the geodetically highest point can thus be kept away from the first filter medium and can be moved into immediate vicinity of the second filter medium.

For example, several openings may be provided which are closed off by a second filter medium, respectively.

According to a further embodiment, the opening is designed as a slotted hole. In this way, a comparatively large opening can be provided. The slotted hole extends preferably in the circumferential direction of the collar.

According to a further embodiment, the opening penetrates the collar in radial direction. In this way, the opening is easily accessible for the gas.

According to a further embodiment, the second filter medium is embedded by injection molding in the collar. This can be done by a plastics injection molding process. In this way, a simple manufacturing process results.

According to a further embodiment, at the raw side a compensation element is provided such that residual fluid that remains after freezing of the fluid can flow through the second filter medium or a third filter medium into a gap between the second filter medium or the third filter medium and the compensation element. This gap can be provided anyway or can be the result of the compensation element receding when the residual fluid flows through the second filter medium or the third filter medium to the raw side. The compensation element preferably comprises an elastomer. The compensation element can be embodied moreover with closed cells or can be foamed. The cells can be filled with air. Preferably, the compensation element comprises an ethylene propylene diene rubber (also referred to as "EPDM") and/or a hydrogenated acrylonitrile butadiene rubber (also referred to as "HBNR"). The compensation element can have a spacing of between 0 mm and 20 mm, preferably between 0 mm and 10 mm, relative to the second filter medium. Several compensation elements can be provided.

According to a further embodiment, the compensation element is designed as an insulator. Accordingly, the spatial arrangement of the not yet frozen residual fluid in the filter element can be controlled such that it collects in an area adjoining the second or third filter medium at the clean side. The desired insulation property of the compensation element can be provided, for example, in that it comprises EPDM or HBNR.

According to a further embodiment, a compensation element is provided which has a channel that connects the opening with the raw side. Accordingly, a simple transport of gases toward the second filter medium is ensured. The channel can be formed, for example, between the compensation element and a further element, for example, an upper end disk of the filter element. Alternatively, the channel can be formed also by means of a through opening in the compensation element itself.

According to a further embodiment, the filter element is designed as a urea filter element.

Moreover, a filter device, in particular a urea filter device, comprising the filter element according to the invention is proposed.

The filter device can comprise a housing in which the filter element is received. For example, the housing can have a connector which is connectable seal-tightly with the connector of the filter element. In particular, the collar of the filter element can be inserted into the connector of the filter device in a seal-tight manner.

Moreover, the filter device can have means, in particular a pump, in order to load the filter element at the clean side with vacuum.

According to a further embodiment, the collar projects upwardly. This means that the filter element is arranged in or inserted into the filter device in such a way that the collar is pointing in upward direction (geodetically).

Further possible implementations of the invention comprise also combinations, not explicitly mentioned, of features or configurations of the filter element or the filter device described above or in the following in regard to the embodiments. In this context, a person of skill in the art will also add or modify individual aspects as improvements or supplements to the respective basic form of the invention.

Further configurations of the invention are subject matter of the dependent claims as well as of the embodiments of the invention described in the following. In the following, the invention will be explained in more detail with the aid of embodiments with reference to the attached Figures.

BRIEF DESCRIPTION OF THE DRAWINGS

In the Figures, same reference characters indicate same or functionally the same elements, inasmuch as nothing to the contrary is indicated.

DESCRIPTION OF PREFERRED EMBODIMENTS

Figure 1:
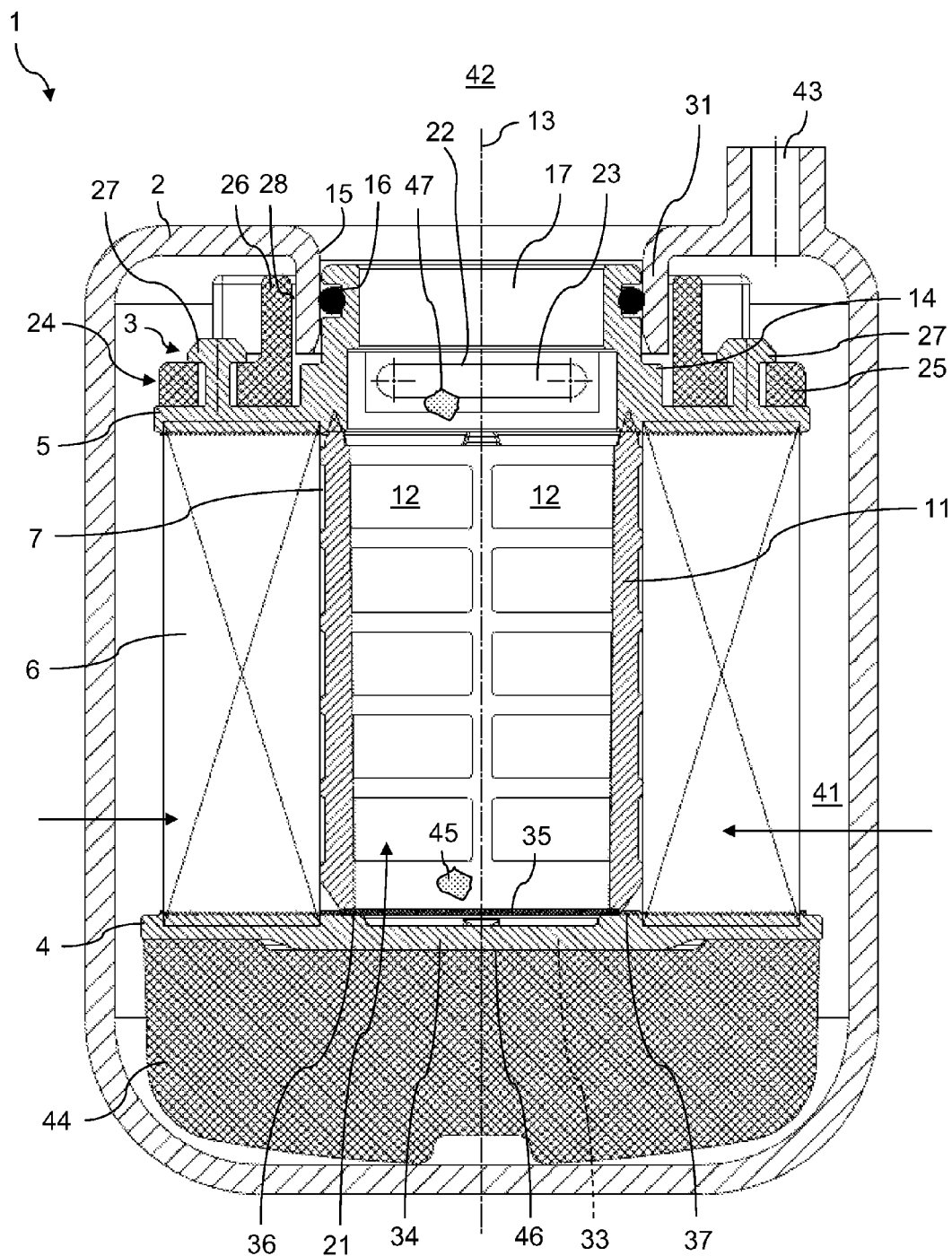
FIG. 1 shows in a section view a filter device according to one embodiment.

FIG. 1 shows in a section view a filter device 1 according to one embodiment.

The filter device 1 can be provided, for example, in a motor vehicle. The filter device 1 can be designed to purify a liquid, in particular a urea solution.

The filter device 1 comprises a housing 2 in which a filter element 3 is arranged. The filter element 3 comprises a first lower end disk 4 and a second upper end disk 5. Between the two end disks 4, 5 a first filter medium 6 in the form of a bellows is arranged. The bellows or the first filter medium 6 has in cross-section (perpendicular to the paper plane) an annular cross-section, for example, and, at its opposite ends, is fluid-tightly welded to the end disks 4, 5. In the interior 7 which is enclosed by the first filter medium 6, a support body in the form of a center tube 11 is arranged. The center tube 11 has radial penetrations 12 toward the first filter medium 6. "Radial", "axial", and "in circumferential direction" relate to a center axis 13 of the filter element 3.

An axial collar 14 of the filter element 3 extends from the end disk 5 into a connecting opening 15 of the housing 2 and seals relative thereto at the outer side, for example, by means of an O-ring 16. The filter element 3 is detachable fastened in the connecting opening 15 and, as needed, can be exchanged. The collar 14 has an opening 17 which is fluid-conductingly connected with the interior 21 of the center tube 11.

Figure 2:
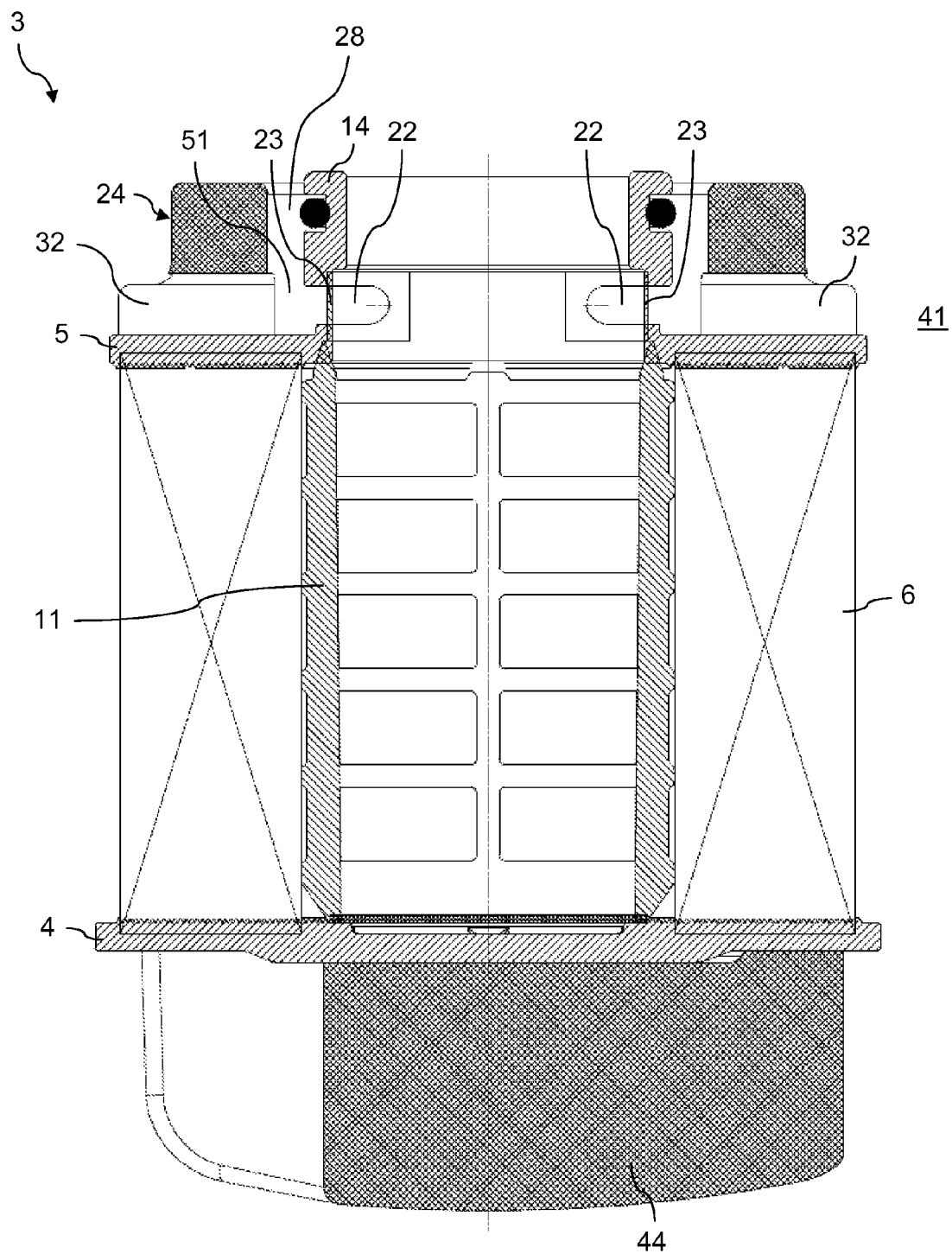
FIG. 2 shows a filter element of the filter device of FIG. 1 in a section illustration, wherein however a section through a plane that is perpendicular to the plane illustrated in FIG. 1 is shown.
Figure 3:
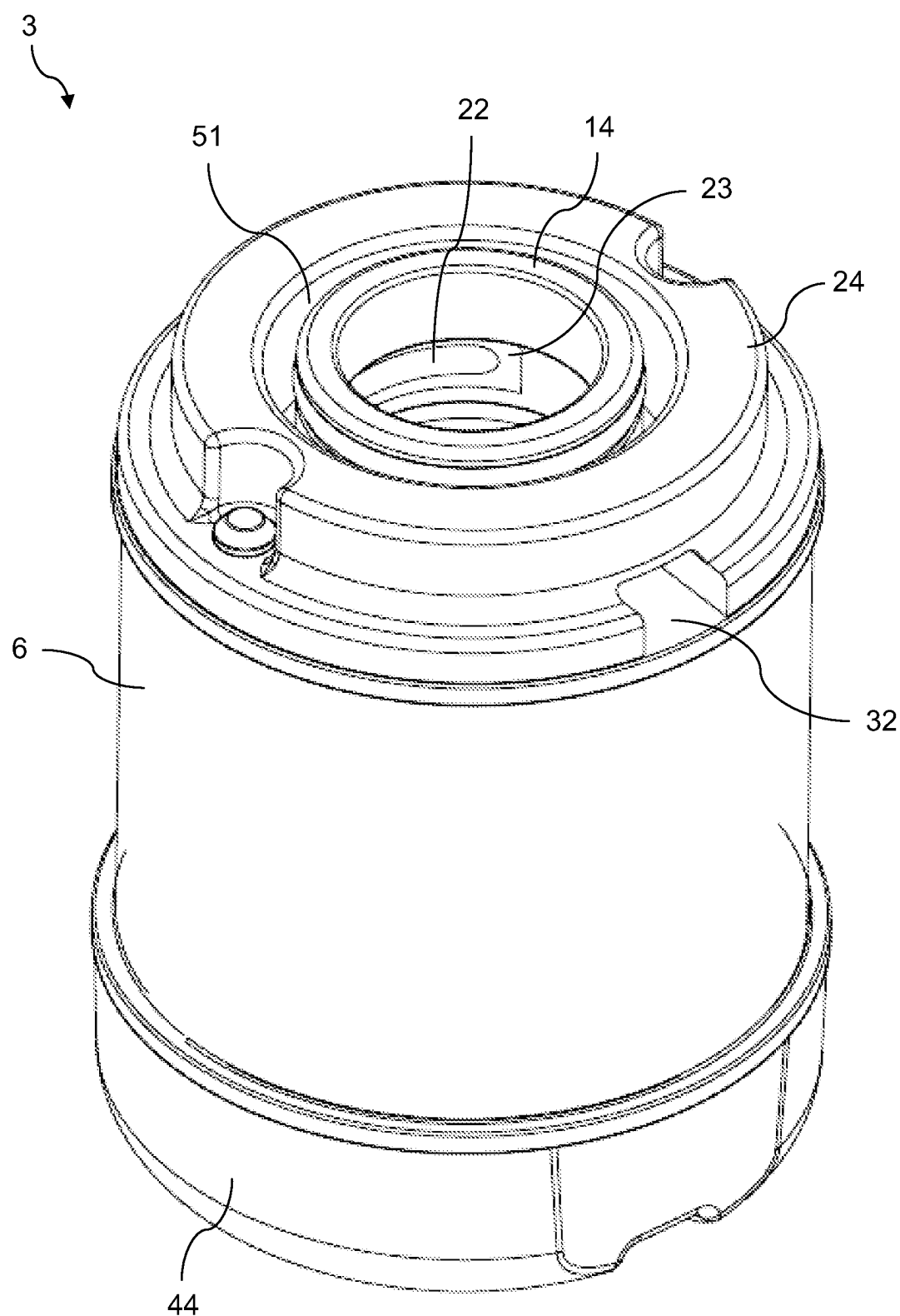
FIG. 3 shows the filter element of FIGS. 1 and 2 in a perspective illustration.

FIG. 2 shows the filter element 3 of FIG. 1 without housing 2 in a section view perpendicular to the plane illustrated in FIG. 1. FIG. 3 shows the filter element 3 of FIGS. 1 and 2 in a perspective illustration at a slant from above. With the aid of FIGS. 2 and 3, in particular the configuration of the collar 14 will be explained in more detail in the following.

The collar 14 has, for example, two slotted holes 22 extending in circumferential direction. The slotted holes 22 form through openings through the collar 14 in radial direction, respectively. The slotted holes 22, as can be seen in FIG. 2, are closed off by a second filter medium 23, respectively. The second filter media 23 are embedded by injection molding into the collar 14, respectively. While the first filter medium 6 is comprised of a hydrophilic material, for example, paper, the second filter media 23 are embodied of a hydrophobic material. In this context, the second filter media 23 can be embodied of PTFE. In the illustrated operating position of the filter element 3, the slotted holes 22 and thus the second filter media 23 are arranged higher (geodetically) than the first filter medium 6.

Moreover, the filter element 3 has a first compensation element 24. The compensation element 24 is comprised of a radial section 25 and an axial section 26. The radial section 25 is resting on the topside of the end disk 5 and can be connected with the latter by means of pins 27 by form fit. The axial section 26 extends parallel to the collar 14 so that an annular gap 28 results in which a socket 31 of the housing 2 that forms a connecting opening 15 is received; see FIG. 1.

As can be seen in FIGS. 2 and 3, in the first compensation element 24 two channels 32 in the form of grooves are formed which extend radially toward the slotted holes 22 or the second filter media 23, respectively. At the bottom side, the respective channel 23 is delimited by the upper end disk 5.

As shown, for example, in FIG. 1, the lower end disk 4 can comprise an opening 33. However, a cross 34 is arranged in the opening 33 so that the opening 33 in FIG. 1 can only be indicated schematically. The cross 34 protects an optionally provided third filter medium 35 from being manually damaged. Relative to the cross 34, the third filter medium 35 is arranged at the inner side, i.e., on the side facing the interior 21. The opening 33 is closed off by the third filter medium 35. The third filter medium 35 according to the embodiment is also hydrophilically embodied. For example, the third filter medium 35 can be embodied of polyamide nonwoven. The third filter medium 35 is connected to the center tube 11, for example, by embedding by injection molding the third filter medium 35. Moreover, the rim area 36 of the third filter medium 35 is welded circumferentially to a rim area 37 of the end disk 4 which delimits the opening 33.

The filter media 6, 23, and 35 separate the filter device 1 into a raw side 41 and a clean side 42. At the raw side 41 the liquid to be purified is located, in particular urea solution, which in operation of the filter device 1 is fed in, for example, by means of a connector 43 (see FIG. 1), and thus substantially exclusively flows through the first filter medium 6 and is purified thereby. The liquid passes in this way to the clean side 42 and is supplied from there, for example, to an exhaust gas manifold of the motor vehicle. A pump for applying vacuum to the filter element 3 or its interior 21 can be provided at the clean side 42.

Applying vacuum has the result that the liquid is degassed and gas will therefore accumulate in a (geodetically) high area of the filter device 2. The first filter medium 6 is substantially impermeable for the gas because it soaks up the liquid to the point of saturation and therefore forms a barrier. The second filter media 23, on the other hand, repel the liquid and are permeable for the gases. Gas at the raw side 41 can thus be fed through the channels 32 to the slotted holes 22 or the filter media 23 and here can pass through the filter media 23 in the form of small bubbles and be supplied to the exhaust gas manifold in an innocuous way. The operating differential pressure which is applied at the filter media 6, 23, 35 is selected, for example, in a range of between 0 bar and 0.7 bar (vacuum operation). The first filter medium 6 (and optionally the third filter medium 35) is liquid-permeable, for example, above a differential pressure of 0 bar while the second filter media 23 become liquid-permeable only above a pressure of, for example, 1.0 bar. This has the effect that, in operation of the filter device 1, liquid flows only through the first filter medium 6 (and optionally through the third filter medium 35, wherein however due to its configuration only very little liquid can pass therethrough) and gas is discharged via the second filter media 23 through the opening 17.

In addition to the first compensation element 24, the filter element 3 can comprise a second compensation element 44 below the lower end disk 4. The second compensation element 44 can be embodied also of EPDM. When in winter the filter device 1 is exposed to very cold conditions, the liquid, in particular the urea solution, may freeze within the housing 2. Freezing occurs in the direction indicated in FIG. 1 by several arrows from the exterior to the interior. The compensation bodies 24, 44 are designed to absorb the liquid volume increase upon freezing of the liquid, in particular the urea solution. Moreover, it may be provided that a residual liquid 45, due to the insulating effect of the compensation element 44, will freeze last. Pressure increase which accompanies freezing of the residual liquid 45 and which may damage the filter element 3 is avoided in that the residual liquid 45 can flow through the third filter medium 35 into a gap 46 between the end disk 4 and the compensation element 44. In the initial state, i.e., prior to freezing of the residual liquid 45, the compensation element 44 can be resting, for example, directly on the end disk 4, as illustrated in FIG. 1. The gap 46 forms then gradually as the residual liquid 45 flows out through the third filter medium 35.

Likewise, it may be provided that residual liquid 47 upon freezing gradually flows out through the second filter media 23 into an annular gap 51 between the compensation body 24 and the collar 14, see FIGS. 2 and 3, in order to prevent pressure increase in the interior 21 of the filter element 3 and to avoid damage of the filter element 3 in this way.

The aforementioned principle is also applicable to oils or liquids based on oil. In this case, the first filter medium 6 is oleophilic and the second filter medium 23 is oleophobic.

While specific embodiments of the invention have been shown and described in detail to illustrate the inventive principles, it will be understood that the invention may be embodied otherwise without departing from such principles.

What is claimed is:

1. A filter element for filtering a fluid, the filter element comprising:
   a first filter medium arranged in an annular shape and surrounding an interior if of the filter element;
   a second filter medium, wherein the first filter medium and the second filter medium separate a clean side of the filter element from a raw side of the filter element;
   wherein the first filter medium and the second filter medium are arranged such that a fluid to be filtered flows from the raw side of the filter element to the clean side of the filter element in parallel through the first filter medium and the second filter medium;
   wherein the first filter medium is liquid-permeable and gas-impermeable and wherein the second filter medium is liquid-impermeable and gas-permeable;
   an end disk arranged at an end face of the first filter medium;
   wherein the second filter medium is arranged in an opening provided in the end disk.

2. The filter element according to claim 1, wherein the first filter medium is hydrophilic and the second filter medium is hydrophobic.

3. The filter element according to claim 1, wherein the first filter medium oleophilic and the second filter medium is oleophobic.

4. The filter medium according to claim 1, wherein the first filter medium is gas-impermeable and liquid-permeable above a first differential pressure,
   wherein the second filter medium is gas-permeable and liquid-impermeable below a second differential pressure,
   wherein the second differential pressure is greater than the first differential pressure, and
   wherein an operating differential pressure at which the filter element is operable is between the first differential pressure and the second differential pressure.

5. The filter element according to claim 1, wherein the first filter medium is of an annular closed configuration,
   wherein the annular closed configuration is a folded star shaped configuration or an annular wound configuration.

6. The filter element according to claim 1, wherein the opening is embodied as a slotted hole.

7. The filter element according to claim 1, wherein the second filter medium is embedded by injection molding in the end disk.

8. The filter element according to claim 1, further comprising
   a compensation element comprising a channel connecting the opening with the raw side.

9. The filter element according to claim 1, further comprising
   a collar connected to the end disk and projecting away from the end disk,
   wherein the collar forms a connector of the filter element for discharging filtered fluid from the filter element or supplying fluid to be filtered to the filter element, and
   wherein the second filter medium is arranged in an opening of the collar.

10. The filter element according to claim 9, wherein the opening is embodied as a slotted hole.

11. The filter element according to claim 9, wherein the opening penetrates the collar radially.

12. The filter element according to claim 9, wherein the second filter medium is embedded by injection molding in the collar.

13. The filter element according to claim 9, further comprising
    a compensation element comprising a channel connecting the opening with the raw side.

14. The filter element according to claim 1 embodied as a urea filter element.

15. A filter device comprising a filter element according to claim 1.

16. The filter device according to claim 15, wherein the filter element comprises a collar projecting in an upward direction away from the first filter medium.

17. A filter element for filtering a fluid, the filter element comprising:
    a first filter medium arranged in an annular shape and surrounding an interior if of the filter element;
    a second filter medium, wherein the first filter medium and the second filter medium separate a clean side of the filter element from a raw side of the filter element;
    wherein the first filter medium and the second filter medium are arranged such that a fluid to be filtered flows from the raw side of the filter element to the clean side of the filter element in parallel through the first filter medium and the second filter medium;
    wherein the first filter medium is liquid-permeable and gas-impermeable and wherein the second filter medium is liquid-impermeable and gas-permeable;
    further comprising at the raw side a compensation element that is arranged such that upon freezing of the fluid a remaining residual fluid flows through the second filter medium into a gap between the second filter medium and the compensation element.

18. A filter element for filtering a fluid, the filter element comprising:
    a first filter medium arranged in an annular shape and surrounding an interior if of the filter element;
    a second filter medium, wherein the first filter medium and the second filter medium separate a clean side of the filter element from a raw side of the filter element;
    wherein the first filter medium and the second filter medium are arranged such that a fluid to be filtered flows from the raw side of the filter element to the clean side of the filter element in parallel through the first filter medium and the second filter medium;
    wherein the first filter medium is liquid-permeable and gas-impermeable and wherein the second filter medium is liquid-impermeable and gas-permeable;
    further comprising a third filter medium separating the clean side and the raw side,
    wherein at the raw side a compensation element is arranged next to the third filter medium, wherein upon freezing of the fluid a remaining residual fluid flows through the third filter medium into a gap between the third filter medium and the compensation element.

* * * * *